(12) United States Patent
Kumbi et al.

(10) Patent No.: US 11,025,713 B2
(45) Date of Patent: Jun. 1, 2021

(54) DYNAMIC ALLOCATION OF EXECUTION RESOURCES

(71) Applicant: ADOBE INC., San Jose, CA (US)

(72) Inventors: Niranjan Shivanand Kumbi, Fremont, CA (US); Ajay Awatramani, Fremont, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/384,646

(22) Filed: Apr. 15, 2019

(65) Prior Publication Data

US 2020/0329097 A1 Oct. 15, 2020

(51) Int. Cl.
| | |
|---|---|
| G06F 15/173 | (2006.01) |
| H04L 29/08 | (2006.01) |
| G06Q 30/02 | (2012.01) |
| G06F 9/50 | (2006.01) |
| G06N 20/00 | (2019.01) |

(52) U.S. Cl.
CPC .......... *H04L 67/1025* (2013.01); *G06F 9/505* (2013.01); *G06N 20/00* (2019.01); *G06Q 30/0202* (2013.01); *H04L 67/1008* (2013.01); *H04L 67/1014* (2013.01)

(58) Field of Classification Search
CPC ............. H04L 67/1025; H04L 67/1008; H04L 67/1014; G06N 20/00
See application file for complete search history.

(56) References Cited

U.S. PATENT DOCUMENTS

| | | | | |
|---|---|---|---|---|
| 6,185,598 B1 * | 2/2001 | Farber | ..................... | G06F 9/505 709/200 |
| 6,314,465 B1 * | 11/2001 | Paul | ..................... | H04L 67/1008 709/217 |
| 7,130,807 B1 * | 10/2006 | Mikurak | ................ | G06Q 10/06 705/7.25 |
| 7,395,335 B2 * | 7/2008 | Brown | ................ | H04L 67/1014 709/203 |
| 2005/0102400 A1 * | 5/2005 | Nakahara | ................ | H04L 29/06 709/225 |
| 2005/0193113 A1 * | 9/2005 | Kokusho | ............. | H04L 67/1008 709/225 |
| 2006/0161641 A1 * | 7/2006 | Sekiguchi | ........... | H04L 67/1029 709/219 |
| 2009/0144416 A1 * | 6/2009 | Chatley | ............... | H04L 67/1012 709/224 |

(Continued)

*Primary Examiner* — Razu A Miah
(74) *Attorney, Agent, or Firm* — Shook, Hardy & Bacon LLP

(57) ABSTRACT

An improved marketing automation system can optimize governance of server resources by managing the execution of campaigns. The marketing automation system can develop intelligence around a given customer's inflow of incoming campaigns, the execution time of the campaigns, and general resource utilization over time. The marketing automation system can learn to predict an expected number and type of campaigns for a pre-defined window of time. This intelligence can be leveraged to ensure that one or more executors remain available to execute predicted high priority campaigns upon placement into an execution queue. Further, this intelligence can be applied such that predicted dormant executors can be used to execute low priority tasks. In this way, the marketing automation system minimizes queue time until execution for high priority campaigns while optimizing use of server resources.

17 Claims, 8 Drawing Sheets

(56) References Cited

U.S. PATENT DOCUMENTS

| | | | |
|---|---|---|---|
| 2010/0274637 A1* | 10/2010 | Li | G06Q 10/06 379/265.06 |
| 2011/0154350 A1* | 6/2011 | Doyle | H04L 67/1008 718/104 |
| 2012/0084419 A1* | 4/2012 | Kannan | H04L 67/1002 709/223 |
| 2012/0151063 A1* | 6/2012 | Yang | H04L 49/90 709/226 |
| 2013/0059607 A1* | 3/2013 | Herz | H04W 8/18 455/456.3 |
| 2013/0136139 A1* | 5/2013 | Zheng | H04L 67/1014 370/401 |
| 2013/0152047 A1* | 6/2013 | Moorthi | G06F 11/368 717/124 |
| 2013/0346146 A1* | 12/2013 | Jaster | G06Q 30/02 705/7.29 |
| 2014/0143189 A1* | 5/2014 | Matsuyama | G01S 5/0278 706/12 |
| 2015/0341407 A1* | 11/2015 | Agnoli | H04L 65/607 709/219 |
| 2015/0379429 A1* | 12/2015 | Lee | G09B 5/00 706/11 |
| 2016/0197975 A1* | 7/2016 | Law | H04L 65/607 709/219 |
| 2017/0024245 A1* | 1/2017 | Goh | G06F 9/5027 |
| 2017/0221156 A1* | 8/2017 | Mingarelli | G06Q 50/01 |
| 2017/0237686 A1* | 8/2017 | Wang | H04L 47/803 709/219 |
| 2017/0359464 A1* | 12/2017 | Segalis | H04M 3/493 |
| 2018/0218453 A1* | 8/2018 | Crabtree | G06Q 40/08 |
| 2019/0066016 A1* | 2/2019 | Ghosh | G06Q 10/06313 |

* cited by examiner

DYNAMIC ALLOCATION OF EXECUTION RESOURCES

BACKGROUND

Business marketing systems are computer-based systems that create and execute campaigns using server resources. Such marketing systems can allow marketers to create campaigns for a specific audience. Such campaigns typically are either marketing campaigns or operational campaigns. Marketing campaigns directly touch a prospect and/or lead and operational campaigns do not have a direct and/or immediate prospect/lead touchpoint. Response latency in marketing campaigns is often very important, especially for campaigns related to "limited time offers," "hot leads," prospects that have filled out a "call me form." Delays in such campaigns often render the campaign ineffective because the lead and/or prospect has lost interest by the time the campaign is run.

A company has finite server resources for running campaigns. Oftentimes, conventional marketing systems schedule campaigns for execution to avoid delays. Many companies (e.g., in the business-to-business marketing world) that have long and complex sales cycles involving lead nurture and lead scoring, the bulk of campaigns of a marketing system are operational campaigns. Conventional marketing systems use ancillary tools to schedule campaigns to prevent operational campaigns from utilizing all server resources and blocking high priority marketing campaigns from being performed by the server resources. Some conventional marketing systems schedule low priority operational campaigns to run during hours of low marketing, such as nightly jobs. However, when scheduled campaigns run over, this can cause delays in marketing campaigns. Other conventional marketing systems can use a marketing calendar to allow marketers to communicate and avoid conflicts between campaigns. However, the scheduling of such conventional marketing systems are manual approaches that can be time consuming, and not always accurate in avoiding delays to high priority marketing campaigns. Further, scheduling using conventional marketing systems often results in underutilization of server resources.

SUMMARY

Embodiments of the present disclosure are directed towards an improved marketing automation system that optimizes usage of server resources by managing the execution of campaigns. In accordance with embodiments of the present disclosure, the marketing automation system predicts an expected number and type of campaigns for a pre-defined window of time. Such a prediction can also include the number of leads and/or actions involved in the campaigns. This prediction can be used to predict an expected server load to ensure that one or more executors remain available to execute predicted high priority campaigns upon placement into an execution queue. Further, the prediction can be applied such that predicted dormant executors can be used to execute low priority campaigns. The marketing automation system monitors the actual number and type of campaigns for the window of time. The marketing automation system can take action when its predictions do not align with the actual number and type of campaigns being received within the window of time. Differences between predicted number and type of campaigns and the actual number and type of campaigns can result in campaigns (e.g., low priority campaigns) assigned to executors interfering with the execution of high priority campaigns (e.g., that were not predicted). Advantageously, the system can quiesce the campaigns (e.g. low priority campaigns) assigned to one or more executors. In this way, high priority campaigns can be run using the now free executors.

DETAILED DESCRIPTION

Figure 1A:
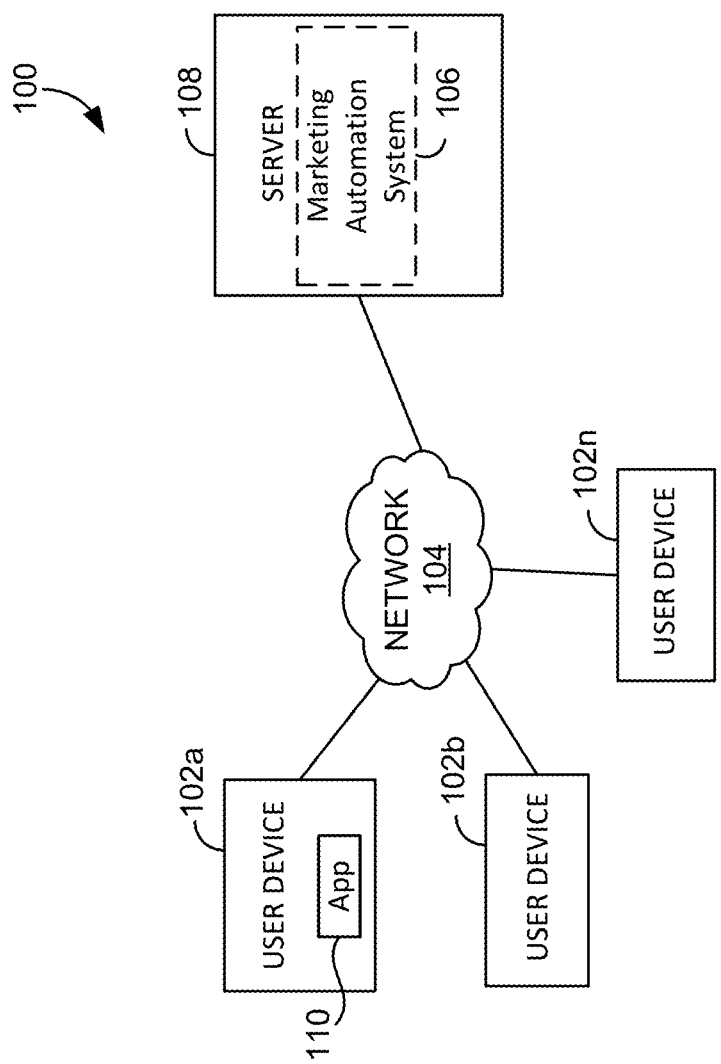
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

A "lead" refers to a potential client or customer that has not yet qualified as a prospect. A lead can be identified from an executed campaign.

A "prospect" refers to a person that meets designated criteria for a campaign. For instance, a prospect can be a person that meets the criteria used to define the audience of a campaign.

A "campaign" generally refers to a marketing activity. A campaign can be comprised of one or more actions to be carried out when the campaign is executed. A campaign can generally involve a target audience, something to do with the target audience, and scheduling when to run the campaign. To create a campaign, first the audience may be defined. An audience can generally be one or more targeted segments of leads and/or prospects (e.g., prospects that visited a website, filled out a form in the last 30 days, etc.). A campaign can also be referred to as a "task."

An "operational campaign" generally does not have a direct and/or immediate prospect touchpoint. Actions of an operations campaign can include actions such as tracking a prospect's behavior based on their activities, standardizing and/or normalizing data (e.g., persona, department, rank standardization), enriching data of a prospect and/or account with data from external sources, managing lead scores, running segmentation activities, moving prospects between different engagement streams, etc. Operational actions typically comprise the bulk of activities performed by a marketing system. Operational campaigns can generally be designated as low priority campaigns.

A "marketing campaign" generally includes touchpoint actions that directly interact with a lead and/or prospect. Response latency in marketing campaigns is often very important, especially for campaigns related to "limited time offers," "hot leads," prospects that have filled out a "call me form." Delays in such campaigns often render the campaign ineffective because the lead and/or prospect has lost interest by the time the campaign is run. Marketing campaigns can generally be designated as high priority campaigns.

A "task" generally refers to a marketing activity and/or campaign. A task can be comprised of one or more actions to be carried out when a campaign is executed.

A "task queue" generally refers to the list of tasks waiting to be executed using server resources (e.g., executors). The task queue can be a single queue. For example, the queue can be priority queue such that a task (e.g., campaign) is placed into the queue based on priority (e.g., one/two or high, medium, low). In other implementations, the incoming queue can one of a set of queues such that a queue is comprised of tasks having the same priority (e.g., high priority queue, low priority queue, etc.).

An "executor" can comprise server resources used to run (e.g., execute) marketing activities (e.g., tasks or campaigns). Initially, executors can be allocated for executing campaigns based on priority level. Over time, intelligence can be leveraged to ensure that one or more executors are available to execute high priority campaigns upon placement into an execution queue while using executors to execute low priority tasks, the executors what would otherwise lay dormant waiting to execute high priority campaigns.

A "server resource" can be one or more server that contain one or more executors (e.g., task executors). Server resource used to implement marketing automation systems can be multi-tenant. For instance, many resources can be shared across customer subscriptions (e.g., shared by multiple companies). Within the context of a single customer, server resources can be allocated using a range (e.g., high bound, low bound).

A "smart controller" can predict and monitor campaign inflow. Predictions can be based on knowledge built around incoming tasks as well as resource utilization. Predictions can be leveraged to ensure that one or more executors are available to execute high priority campaigns upon placement into an execution queue (e.g., based on when high priority campaigns are predicted). Predictions can be used to allocate predicted dormant executors to execute low priority tasks. Monitored actual task inflow can be compared with the predicted inflow. Comparing the prediction with what is actually happening in real-time may result in determining that some action needs to be taken to mitigate a situation (e.g., an unpredicted high priority campaign is received and all executors are being utilized to execute low priority campaigns).

Marketing systems are computer-based systems that generally enable marketing departments of organizations of varying sizes to automate a variety of marketing activities. Automating marketing activities may allow for efficiently scaling operations with a finite set of users (e.g., marketers). Marketing activities can relate to actions and events such as executing campaigns and receiving/processing information related to executed campaigns. A campaign can be comprised of one or more actions to be carried out when the campaign is executed. Typically, campaigns can be designated as a marketing campaign or an operational campaign. Actions of a marketing campaign can include touchpoint actions that directly interact with a lead and/or prospect. Actions of an operations campaign can include actions such as tracking a prospect's behavior based on their activities, standardizing and/or normalizing date (e.g., persona, department, rank standardization), enriching data of a prospect and/or account with data from external sources, managing lead scores, running segmentation activities, moving prospects between different engagement streams, etc.

A marketing system employs server resources to process a variety of internal activities (e.g., carrying out marketing campaigns, carrying out operational campaigns, processing events related to executed campaigns). Operational actions typically comprise the bulk of activities performed by a marketing system. This results in activities that do not have a direct and/or immediate prospect touchpoint (e.g., operational campaigns) consuming a large portion of server resources available for executing marketing activities. The large number of operational campaigns often can result in delays in executing marketing campaigns that have a direct prospect touchpoint. Response latency in marketing campaigns is often very important, especially for campaigns related to "limited time offers," "hot leads," prospects that have filled out a "call me form." Delays in such campaigns often render the campaign ineffective because the lead and/or prospect has lost interest by the time the marketing campaign is run.

Conventional approaches attempt to mitigate delays in server resources executing marketing campaigns. Conventional marketing systems rely on ancillary tools for scheduling when server resources are to execute campaigns to try prevent operational campaigns from utilizing all server resources and blocking high priority marketing campaigns. Such ancillary tools can be used to schedule lower priority campaigns during hours of low marketing activity (e.g., at night) or coordinate using a marketing calendar to allow marketers to communicate and avoid conflicts between campaigns. However, scheduling campaigns using conventional techniques is often ineffective at running operational campaigns in a manner that prevents delays to high priority marketing campaigns (e.g., because low priority campaigns scheduled in off hours often spill over into the time when marketers try to schedule high priority campaigns). Further, scheduling techniques of conventional marketing systems often result in times of underutilization of server resources (e.g., due to executors sitting idle waiting for a high priority campaign even though there is a queue of low priority campaigns). As such, existing marketing systems are generally deficient in minimizing queue time until execution for marketing campaigns while optimizing use of server resources.

Accordingly, embodiments of the present disclosure are directed to an improved marketing automation system that addresses the technical deficiencies of existing marketing automation systems by improving optimization of server resources. In particular, and as described herein, the marketing automation system can automate governance of server resources by managing the execution of campaigns. In embodiments, campaigns can be evaluated and assigned for an executor based on action related to a campaign, a classification of the campaign, and/or a priority assigned to the campaign. For instance, actions related to a campaign can be evaluated. Such actions can be used to determine a classification for the campaign. As an example, when actions involve prospect touch, the campaign can be classified as a marketing campaign. In other instances, when actions involve internal data processing (that does not involve prospect touch), the campaign can be classified as an operational campaign. In some implementations, the classification can be used to assign a priority to the campaign (e.g., marketing campaigns can be assigned a priority one and campaigns classified as operational campaigns can be assigned priority two). In other embodiments, the actions related to the campaign can be used to prioritized the campaign (e.g., as high, medium, or low).

The campaigns can be assigned to executors. In some instances, campaigns can be assigned based on its classification and/or priority. For instance, executors can be allocated to run campaigns based on priority level. In this way, a campaign with a particular priority level (e.g., high) can be assigned to an executor allocated to run campaigns of that priority level (e.g., allocated to run high priority campaigns). As a non-limiting example, if there are ten executors, six can be allocated for executing high priority campaigns (e.g., time sensitive marketing campaigns), while the remaining four can be dedicated to executing low priority campaigns. In other cases, campaigns can be assigned to executors based on the activities of the campaigns.

Over time, aspects of the marketing automation system can develop intelligence around a given customer's inflow of incoming campaigns, the execution time of the campaigns, and general resource utilization over time. In particular, aspects of the marketing automation system can learn to predict an expected number and type of campaigns for a pre-defined window of time (e.g., including the number of leads and/or actions involved in the campaigns). This intelligence can be leveraged to ensure that one or more executors remain available to execute high priority campaigns as soon as the high priority campaigns are placed into an execution queue. At the same time, this intelligence can be applied such that dormant executors, which may be allocated for executing high priority campaigns, can be used to execute low priority tasks. Advantageously, such intelligence can be used to optimize server resources (e.g., ensuring executors do not sit dormant because there are not high priority campaigns when there are one or more low priority campaigns in the execution queue). As an example, this ensures high priority campaigns execute with minimum latency while low priority campaigns are never fully starved.

As described herein, the marketing automation system can generally predict a task inflow for a window of time. At a high-level, to predict task inflow, a smart controller of the marketing automation system can be used. Predictions can be based on knowledge built around incoming tasks as well as resource utilization. Intelligence from such built knowledge can be used to predict, for example, days and/or hours during which a customer typically runs marketing campaigns (e.g., a customer typically runs its most important—high priority—marketing campaigns on Wednesday and Thursday from 6 am to 12 pm). Advantageously, this intelligence can be leveraged to ensure that one or more executors are available to execute high priority campaigns upon placement into an execution queue (e.g., based on when high priority campaigns are predicted). At the same time, this intelligence can be applied advantageously, such that dormant executors, which may otherwise be allocated for executing high priority campaigns (and idle when no high priority campaigns are in the queue), can be used to execute low priority tasks.

Further, the marketing automation system can generally monitor actual task inflow for the predicted window of time. The monitored actual task inflow can be compared with the predicted inflow. Comparing the prediction with what is actually happening in real-time may result in determining that some action needs to be taken to mitigate a situation (e.g., an unpredicted high priority campaign is received and all executors are being utilized to execute low priority campaigns). In particular, the marketing automation system can identify situations when the tasks (e.g., low priority campaigns) assigned to executors are interfering with the execution of high priority campaigns (e.g., that were not predicted). Advantageously, the system can quiesce the tasks (e.g. low priority tasks) assigned to one or more executors. For instance, the monitoring component can quiesce low priority tasks being run on executors and/or assigned to run on executors. In this way, high priority campaigns can be run using the now free executors.

Turning now to FIG. 1A, an example configuration of an operating environment is depicted in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102*a* through 102*n* can be any type of computing device capable of being operated by a user. For example, in some implementations, user devices 102*a* through 102*n* are the type of computing device described in relation to FIG. 7. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 for automating governance of server resources (e.g., by managing the execution of campaigns). In some implementations, the application(s) comprises a web application, which can run in a web browser, and could be hosted at least partially on the server-side of environment 100. In addition, or instead, the application(s) can comprise a dedicated application, such as an application having marketing automation functionality. Such an application can be used to create campaigns, execute campaigns, and/or receive/process information related to executed campaigns. In some cases, the application is integrated into the operating system (e.g., as a service). It is therefore contemplated herein that "application" be interpreted broadly.

In accordance with embodiments herein, the application 110 facilitates creating campaigns, executing campaigns, and/or receiving/processing information related to executed campaigns. In embodiments, the execution of campaigns can be managed by automating governance of server resources, for instance, using application 110. In some implementations, a campaign can be created using application 110. In instances, the created campaign can be submitted for execution or otherwise added to a queue for execution. Based on the action(s) comprising the campaign, the campaign can be assigned a priority. Such a priority can be used to implement the running of the campaign using one or more executors. In embodiments, the executor(s) can be allocated to run campaigns based on priority.

As described herein, server 108 facilitates automating governance of server resources (e.g., by managing the execution of campaigns) via marketing automation system 106. Server 108 includes one or more processors, and one or more computer-readable media. The computer-readable media includes computer-readable instructions executable by the one or more processors. The instructions may optionally implement one or more components of marketing automation system 106, described in additional detail below.

Marketing automation system 106 assigns campaigns to run on executors. The system employs predictions about a number and type of campaigns expected within a predefined window of time. In this regard, marketing automation system 106 ensure that one or more executors are available to execute high priority campaigns as soon as the high priority campaigns are placed into an execution queue optimizing usage by executing low priority tasks when no high priority campaigns are predicted for execution.

For cloud-based implementations, the instructions on server 108 may implement one or more components of marketing automation system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of marketing automation system 106 may be implemented completely on a user device, such as user device 102*a*. In this case, marketing automation system 106 may be embodied at least partially by the instructions corresponding to application 110.

Figure 1B:
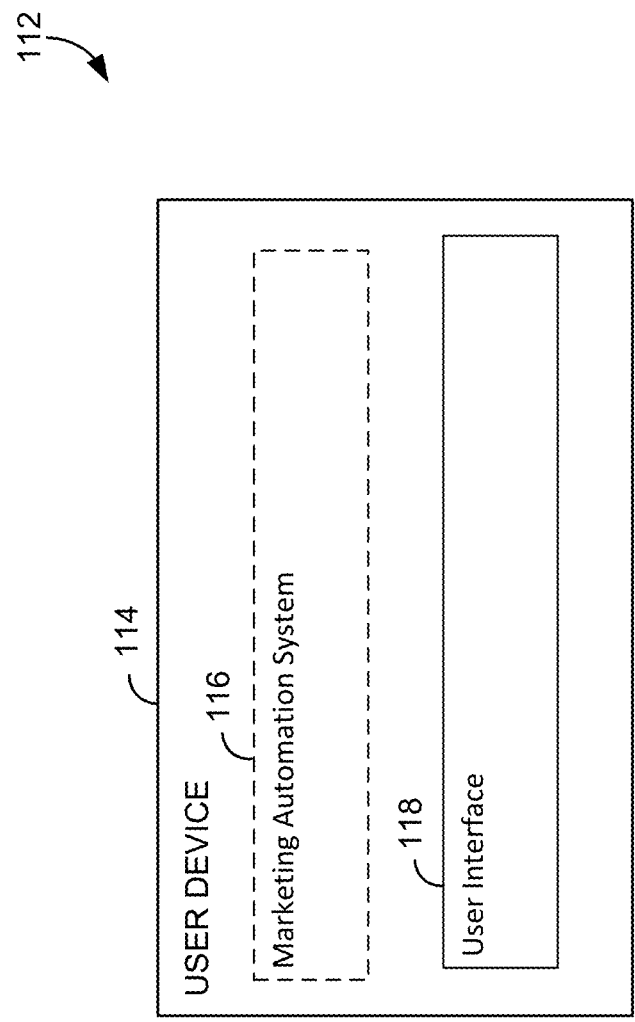
FIG. 1B depicts an example configuration of another operating environment in which some implementations of the present disclosure can be employed, in accordance with various embodiments.

Referring to FIG. 1B, aspects of an illustrative marketing automation system are shown, in accordance with various embodiments of the present disclosure. FIG. 1B depicts a user device 114, in accordance with an example embodiment, configured to allow for g creating campaigns, executing campaigns, and/or receiving/processing information related to executed campaigns using a marketing automation system 116. In embodiments, the execution of campaigns can be managed by automating governance of server resources, for instance, using marketing automation system 116. The user device 114 may be the same or similar to the user device 102*a*-102*n* and may be configured to support the marketing automation system 116 (as a standalone or networked device). For example, the user device 114 may store and execute software/instructions to facilitate interactions between a user and the marketing automation system 116 via the user interface 118 of the user device.

Figure 2:
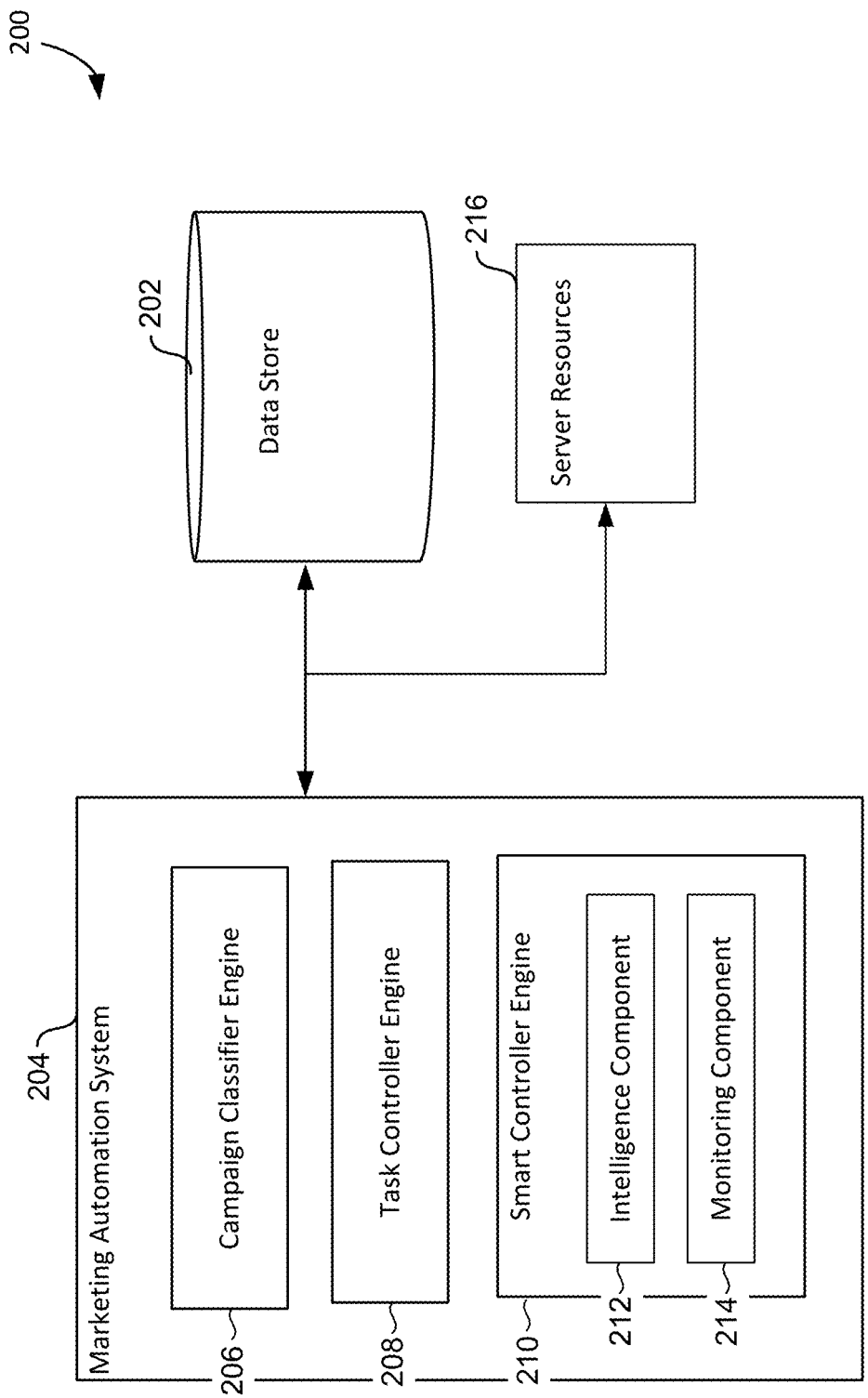
FIG. 2 depicts an example configuration of a further operating environment in which some implementations of the present disclosure can be employed, in accordance with various embodiments.

FIG. 2 depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7. It should be understood that operating environment 200 shown in FIG. 2 is an example of one suitable operating environment. Among other components not shown, operating environment 200 includes a number of user devices, networks, and server(s).

As depicted, marketing automation system 204 includes campaign classifier engine 206, task controller engine 208, and smart controller engine 210. The foregoing engines of marketing automation system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the marketing automation system.

As shown, marketing automation system 204 operates in conjunction with data store 202. Data store 202 can store computer instructions (e.g., software program instructions, routines, or services), data, and/or models used in embodiments described herein. In some implementations, data store 202 stores information or data received via the various engines and/or components of marketing automation system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 includes training data. Training data generally refers to data used to train a model (e.g., a machine learning model). As such, training data can include historical inflow and outflow of campaign tasks for a customer. In some cases, data can relate to events, activities, time stamps, campaigns timing (e.g., when campaigns are received), execution time (e.g., how long campaigns took to process). Such data can be received from and sent to marketing automation system 204. In other cases, data can be received directly from user devices or from one or more data stores in the cloud.

In some embodiments, a client can have preexisting information related to campaigns (e.g., stored as a dataset). Such preexisting information can be used to jumpstart the training of a smart controller (e.g., smart controller engine 210) related to marketing automation system 204. In implementations, knowledge can be built and stored in the data store over time as the marketing automation system executes campaigns (e.g., marketing and operational campaigns).

In implementations, server resources 216 can include one or more servers containing one or more executors (e.g., task executors). Such executors can comprise server resources used to run (e.g., execute) marketing activities (e.g., campaigns). Server resource used to implement marketing automation systems can be multi-tenant. For instance, many resources can be shared across customer subscriptions (e.g., shared by multiple companies). Within the context of a single customer, server resources can be allocated using a range (e.g., high bound, low bound). This range can indicate what range of resources the client has access to utilize in running marketing activities. As an example, if there are 10 resources, each customer can generally be allocated one resource. However, if needed, the customer can go beyond that one resource, up to two of the resources. In such an example, a resource can be a task executor.

Marketing automation system 204 captures activities (e.g., from prospects), defines campaigns, and executes the campaigns. Such a system can automate governance of server resources by managing the execution of campaigns as tasks using executors. Initially, executors can be allocated for executing campaigns based on priority level. For example, if there are ten executors, six or seven can be dedicated for executing high priority campaigns (e.g., time sensitive marketing campaigns), while the remaining three or four can be dedicated to executing low priority campaigns. Over time, the marketing automation system 204 can develop intelligence around a given customer's inflow/outflow of incoming tasks and resource utilization. In particular, aspects of the marketing automation system can learn to predict an expected number and type of campaigns within a pre-defined timeframe. This intelligence can be leveraged to ensure that one or more executors are available to execute high priority campaigns upon placement into an execution queue. At the same time, this intelligence can be applied such that dormant executors, which may be allocated for executing high priority campaigns, can be used to execute low priority tasks.

Campaign classifier engine 206 can classify and/or assign priority to campaigns. To classify a campaign, the campaign classifier engine can evaluate actions (e.g., engagement actions) related to the campaign. One or more actions can be linked to a campaign. Such actions can be analyzed to determine if the actions correspond to a prospect touch or an operational campaign. In this way, campaign classifier engine 206 can classify a campaign as a marketing campaign or a non-marketing (i.e., operational) campaign using the analyzed actions. In some implementations, campaigns classified as marketing campaigns can be assigned a priority one and campaigns classified as operational campaigns can be assigned priority two. In other implementations, based on the actions related to a campaign, the campaign can be prioritized as high, medium, or low. In further implementations, marketing campaigns can be assigned a priority one and campaigns classified as operational campaigns can be assigned priority two. Further, within priority levels one and two, campaigns can be prioritized as high, medium, or low. Preset designations (e.g., related to actions used in campaigns) can be used to determine the priority of a campaign. In some embodiments, assigning a priority can be performed manually. In further embodiments, assigning a priority can be performed automatically (e.g., using the preset designations). After classifying and/or assigning priority to a campaign, the campaign classifier can add the campaign as a task in a task queue (e.g., in task controller engine 208).

Task controller engine 208 may be used to assign campaigns to executors. To assign campaigns, the task controller engine can select a task from an incoming queue (e.g., from campaign classifier engine 206). In implementations, the incoming queue can be a single queue. For example, the queue can be priority queue such that a task (e.g., campaign) is placed into the queue based on priority (e.g., one/two or high, medium, low). In other implementations, the incoming queue can one of a set of queues such that a queue is comprised of tasks having the same priority (e.g., high priority queue, low priority queue, etc.).

The task selected from the queue by the task controller engine can have associated information. Such information can relate to the priority level and/or classification of the task. This information can be used by the task controller engine to assign the task to an executor. In embodiments, executors can be allocated for executing campaigns based on priority level. For example, if there are ten executors, six or seven can be dedicated for executing high priority campaigns (e.g., time sensitive marketing campaigns), while the remaining three or four can be dedicated to executing low priority campaigns. Allocating a pre-defined set of executors for each class of campaigns ensures that a certain quality of service is maintained (e.g., with higher priority campaigns getting a large allocation of executors).

Task controller engine 208 can manage tasks (e.g., campaigns) for an entire company. Within a company, there may be multiple marketers that create campaigns. A campaign can generally involve a target audience, something to do with the target audience, and scheduling when to run the campaign. To create a campaign, first an audience may be defined. An audience can generally be one or more targeted segments (e.g., prospects that visited a website, filled out a form in the last 30 days, etc.). An audience can be defined using categories comprising filter and triggers. A filter category can be attributes of a lead, and/or attributes of a prospect, and/or anything the lead and/or prospect has done in the past. A prospect can be a person that meets designated criteria (e.g., of the audience). A lead can be a potential client or customer that has not yet qualified as a prospect. For instance, first a lead can be identified and then later qualified as a prospect. A trigger category can designate how a campaign is triggered. For example, a campaign can be triggered at a moment based on an action occurring (e.g., a lead/prospect clicking on an email). As another example, campaigns can be executed as a batch (e.g., sending out a monthly newsletter). The aspects of a created campaign can be used to classify the campaign (as discussed with reference to campaign classifier engine 206).

The task controller engine can manage tasks (e.g., campaigns) created by marketers for an entire company. Created campaigns can all be received and/or input into marketing automation system 204. In this way, campaigns (e.g., created by one or more marketers) can enter into an execution queue based on priority and/or classification. Campaigns entering the task controller engine can be treated equally (e.g., based on priority and/or classification not based on the marketer that created the campaign).

Over time, task controller engine 208 can be instructed and/or overridden by smart controller engine 210. In particular, smart controller engine 201 can build intelligence around a given customer's inflow/outflow of incoming tasks and resource utilization. This intelligence can be leveraged to more efficiently and effectively assign tasks to executors.

As depicted, smart controller engine 210 includes intelligence component 212 and monitoring component 214. The foregoing components of smart controller engine 210 can be implemented, for example, in operating environment 100 of FIG. 1A and/or operating environment 112 of FIG. 1B. In particular, these components may be integrated into any suitable combination of user devices 102a and 102b through 102n and server(s) 106 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the smart controller engine.

Smart controller engine 210 can continuously monitor trends for a given customer subscription. In particular, the smart controller engine can monitor incoming tasks, priority of the incoming tasks, and execution time of the tasks related to a customer. This information can be used by the smart controller engine to develop intelligence around the historical inflow and outflow of campaign tasks for the customer. Over time, as the smart controller develops its intelligence, a threshold of confidence can be reached. For instance, when the predictions of the smart controller engine are accurate or reasonably accurate when compared to actual incoming tasks (e.g., volume, priority, execution time), the smart controller engine can begin to oversee (e.g., manage) the task controller engine.

Predictions from the smart controller engine can be combined with information regarding the state of tasks that are in-flight to make smart decisions to optimize the flow in the system. As an example, the smart controller engine can collect and analyze historical data around attributes. Such attributes can include one or more of the number of distinct campaigns for designated windows of time (e.g., 15 minute windows), the classification of those campaigns (e.g., marketing or operational), the priority of the campaigns (e.g., high, medium, low), the number of campaigns of each category type and/or priority level during the window of time, the average execution time, the average execution across campaigns, average uptick in tasks week over week, month over month, etc. Utilizing knowledge from analyzing such attributes, the smart controller engine can develop intelligence for predicting the number of campaigns (e.g., tasks) expected by a customer subscription for a given window of time (e.g., month, week, day, 15-minute duration). Such intelligence can be used to issue instructions to optimize the executions of campaigns as well as optimize end-user experience (e.g., minimized latency of marketing campaigns) of a marketing automation system.

Intelligence component 212 of the smart controller engine can be implemented as a learning model. The learning model can be built from intelligence or historical knowledge about when the system usage of server resources (e.g., executors). The learning model can be based on machine learning algorithms. In some embodiments, the learning model can be based on a regression (i.e., forecasting) model. In other embodiments, the learning model can be based on any number of machine learning techniques, including, for instance, multi-variable regression algorithms, polynomial regression algorithms, or any class of multinomial classification machine learning algorithms (e.g., k-nearest neighbors, random forest, SVM, etc.). Such a model can learn to predict the inflow of tasks during a given timeframe. For instance, the intelligence component can build knowledge about when the system receives the highest number of high priority campaigns, how long the high priority campaigns take to execute, when the system receives low priority campaigns and how long the low priority campaigns take to execute. In this way, the intelligence component builds knowledge about characteristics related to a given customer. Such characteristics can include peak hours, off-peak hours, average execution time, and such forth within a given customer subscription.

Intelligence component 212 can predict timeframes during which the server resources are not being fully utilized. Predictions can be based on the knowledge built around incoming tasks as well as resource utilization. Intelligence from such built knowledge can be used to predict, for example, days and/or hours during which a customer typically runs marketing campaigns (e.g., a customer typically runs its most important—high priority—marketing campaigns on Wednesday and Thursday from 6 am to 12 pm).

The learning model of the intelligence component can begin with little to no knowledge of a customer. In some embodiments, a client can have preexisting information related to campaigns. Such information can relate to events, activities, time stamps, campaigns timing (e.g., when campaigns are received), execution time (e.g., how long campaigns took to process). This preexisting information can be used to jumpstart the training of the learning model. Such information might not include everything that the learning model typically uses to build knowledge about a customer; however, such information can be enough to bring the intelligence component of smart controller up to speed. In other embodiments, a learning model can build its knowledge over time as the marketing automation system executes marketing and operational campaigns. Regardless of how or when information is obtained to train the learning model, eventually the model can reach a threshold level of confidence. For instance, the learning model can reach a level where its predictions are accurate or reasonably close to accurate (e.g., within a pre-defined threshold of accuracy, for instance, 95% accurate). Upon reaching such a threshold of level of confidence, the intelligence component can begin to oversee the task controller.

Intelligence component 212 can oversee the task controller engine. In embodiments, the intelligence component can predict, for an upcoming window of time, whether the number of high priority campaigns in the queue of the task controller engine will utilize the entire set of allocated executors. In other instances, the intelligence component can predict, for an upcoming window of time, what percentage of allocated executors will be utilized by high priority campaigns likely to be in the queue of the task controller engine. As an example, the intelligence component can predict resource utilization for a certain category of campaign for a next window of time (e.g., 10 minutes, 15 minutes, 30 minutes).

When resource utilization for a certain category of campaign (e.g., high priority) is not maximized, the intelligence component can issue instructions to the task controller engine based on this prediction. In particular, the instructions can indicate a number of tasks sitting in the queue of the task controller engine be assigned to one or more executors. In embodiments, a number of low priority tasks sitting in the queue of the task controller engine can be assigned to one or more executors that typically execute high priority campaigns. In this way, for a predicted window of time that the intelligence component forecasts, instructions can be issued that will pull one or more tasks from one category and assign the tasks to one or more executors. These tasks can be selected because they are predicted to be completed during the window of time. For instance, when the predicted resource utilization (or one or more executors) for the next window of time is 20%, 80% of the resources are predicted to be dormant. The intelligence component can determine one or more tasks in the queue that can be run using the remaining 80% of the resources during the window of time. In some embodiments, the allocation of resources (e.g., number of executors designated for each category of campaign) can be used to determine the predicted resource utilization.

As the intelligence component reaches and obtains the threshold level of confidence, the initial allocation of the executors (e.g., based on priority/category of campaign) can begin to become irrelevant. Instead, the intelligence of the smart controller can take over the assignment of tasks by issuing instructions to the task controller engine based on the predicted windows of time. Such instructions allocate different campaigns in different categories (i.e., priorities) to executors based on the predicted time intervals. In this way, dedicated allocations of executors are not needed unless an outlier event triggers the system to reset back to an initial (e.g., pre-set) allocation of executors.

To ensure that the predictions of the intelligence component are accurate, monitoring component 214 can compare the prediction from the intelligence component with what is actually happening in real-time. In this way, the smart controller engine continually monitors (e.g., using monitoring component 214) as well as predicting (e.g., using intelligence component 212). The comparisons between the predictions and real-time inflow (of campaigns) can be used to update the learning model. In this way, the learning model can be constantly updated (e.g., undergo continuous learning). For example, the learning model can be updated periodically (e.g., once a day, once a week, twice a month).

In comparing the prediction from the intelligence component with what is actually happening in real-time, monitoring component 214 may determine that some action needs to be taken to mitigate a situation. In particular, when the tasks (e.g., low priority campaigns) assigned to executors is interfering with high priority campaigns (e.g., that were not predicted). The monitoring component can quiesce the tasks in execution. For instance, the monitoring component can quiesce low priority tasks being run on executors. In this way, high priority campaigns can be run using the now free executors. Monitoring component 214 can gracefully shut down and/or send low priority tasks back into the queue and send instructions such that the high priority task can be assigned to those executors. Sometimes it is not possible to pause or abort a task being executed (e.g., mid-way through execution). In such cases, the task can continue through completion. Because predictions are made for windows of time, even when a task cannot be quiesced, a high priority task should not remain in the queue for longer than the time window. For example, if a time window of predicted resource utilization is for 10 minutes and low priority tasks are assigned to all executors (and cannot be paused/aborted mid-execution), a high priority task should only have to wait in the queue for 10 minutes until the low priority tasks complete execution. This waiting time can be lessened if one or more of the low priority tasks can be quiesced and sent back to the queue managed by the task controller engine.

In embodiments, the monitoring component can also determine whether a threshold is exceeded such that the initial allocation model of the server resources is reinstated. For instance, a threshold can be exceeded when there is not enough data to make accurate predictions. As an example, Black Friday happens once a year or a day that a company launches a new product. In other instances, a threshold can be exceeded when a number of predictions windows (e.g., 3, 5, and 10) continually reach a level of inaccuracy when compared to real-time task intake (e.g., 50%, 75%). In other embodiments, when a high level of tasks are received, the threshold can be exceeded.

Figure 3:
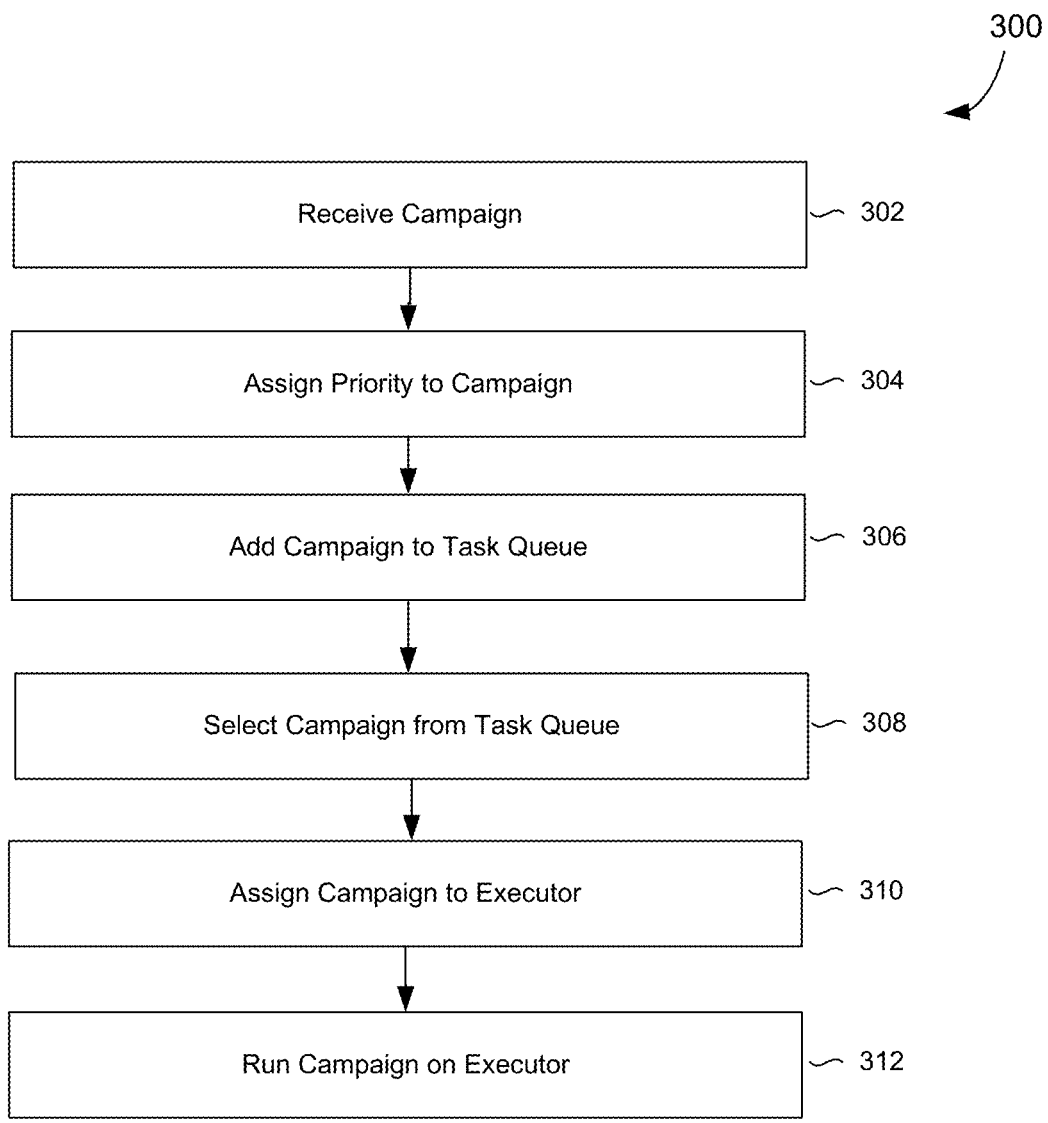
FIG. 3 provides a process flow showing an embodiment for implementing improved marketing automation system for optimally assigning campaigns for execution, in accordance with embodiments of the present disclosure.

With reference to FIG. 3, a process flow is provided showing an embodiment of method 300 for implementing an improved marketing automation system for optimally assigning campaigns for execution, in accordance with embodiments of the present disclosure. The marketing automation system can automate governance of server resources (e.g., executors) by managing the execution of tasks on executors. Aspects of method 300 can be performed, for example, by campaign classifier engine 206, task controller engine 208, and smart controller engine 210 as discussed with reference to FIG. 2.

At block 302, a campaign is received. A campaign can be created for a defined audience and/or segment. The campaign can also identify actions to be carried out (e.g., an email touch, an offer, or to notify a sales representative to engage with a prospect). Upon creating a campaign, the campaign can be input into a marketing automation system (e.g., marketing automation system 204). The campaign can be input into the system in any manner. For example, a marketer that creates the campaign can indicate the campaign should be submitted for execution (e.g., using the marketing automation system).

At block 304, a priority is assigned to the campaign. Priority can be assigned based on a classification of the campaign. For instance, campaigns can be classified as operational or marketing. Operational campaigns can be campaigns that do not directly interact with a lead or prospect. Marketing campaigns, on the other hand, can be campaigns that directly interact (i.e. touch) a lead or prospect. Actions associated with the campaign can be used for classification. Operational actions can include actions such as tracking a prospect's behavior based on their activities, standardizing and/or normalizing date (e.g., persona, department, rank standardization), enriching data of a prospect and/or account with data from external sources, managing lead scores, running segmentation activities, moving prospects between different engagement streams, etc. Marketing actions can include action such as sending something (e.g., sending an offer, an invitation to an event, an email for an offer), interacting with a customer (e.g., a customer did something interesting, log it, and send something based on the interesting event (send alert to sales rep), and other actions directly interacting with a lead and/or prospect.

By analyzing the actions associated with the campaign, the campaign can be assigned a priority. For example, a campaign classified as a marketing campaign can be assigned a priority one and a campaign classified as an operational campaign can be assigned priority two. As another example, the campaign can be prioritized as high, medium, or low based on the engagement actions related to a campaign. As another example, some combination of priority one/two and high, medium, and low can be used to assign priority to a campaign.

At block 306, the campaign is added to a task queue. In embodiments, there can be a single task queue for the marketing automation system. Within such a single task queue, tasks can be ordered based on priority (e.g., one/two or high, medium, low). In other implementations, there can be multiple task queues for the marketing automation system. When using multiple task queues, each priority of campaign can have its own queue (e.g., high priority queue, low priority queue, etc.). It should be appreciated that in some embodiments, that there can be further priority within each level of priority (e.g., priority one level queue with high, medium, low priority campaigns).

At block 308, a campaign is selected from the task queue. Selection can occur using information associated with the campaign. For instance, the campaign can be selected based on priority and/or classification. This information can be used to assign the task to an executor. In other instances, a campaign can be selected based on recency (e.g., when the campaign was added to the queue). In this way, at block 310, a campaign is assigned to an executor. In embodiments, the executors can initially be allocated for executing campaigns based on priority level. For example, if there are ten executors, six or seven can be dedicated for executing high priority campaigns (e.g., time sensitive marketing campaigns), while the remaining three or four can be dedicated to executing low priority campaigns. Allocating a predefined set of executors for each class of campaigns ensures that a certain quality of service is maintained (e.g., with higher priority campaigns being assigned a large allocation of executors).

In further embodiments, the executors can be managed based on intelligence developed around a historical inflow and outflow of campaign tasks for a customer. For instance, knowledge can be built around when the system receives the highest number of high priority campaigns, how long the high priority campaigns take to execute, when the system receives low priority campaigns and how long the low priority campaigns take to execute. The intelligence can be used to predict, for an upcoming window of time, whether the number of high priority campaigns in the queue of the task controller will utilize the entire set of allocated executors. In other instances, the intelligence component can predict, for an upcoming window of time, what percentage of allocated executors will likely be utilized by high priority campaigns (e.g., the predicted high priority campaigns and associated execution times likely to be in the queue of the task controller). As an example, the intelligence component can predict resource utilization for a certain category of campaign for a next window of time (e.g., 10 minutes, 15 minutes, 30 minutes.

At block 312, the campaign is run on the executor. The executer can execute the campaign. For example, when the campaign is sending out an offer, the executor can implement sending out an email with the offer.

Figure 4:
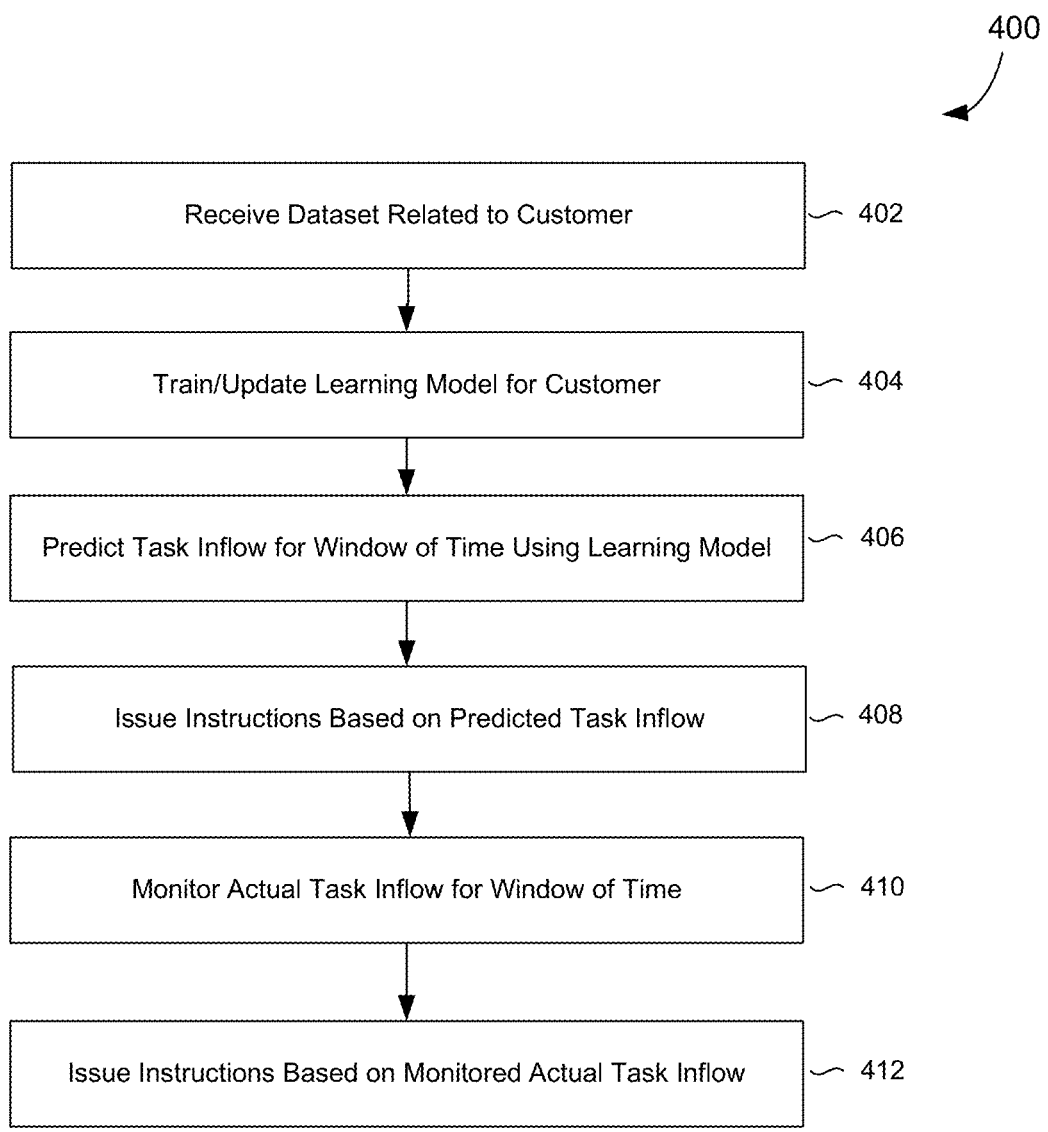
FIG. 4 provides a process flow showing an embodiment for implementing an improved marketing automation system having a smart controller, in accordance with embodiments of the present disclosure.

With reference to FIG. 4, a process flow is provided showing an embodiment of method 400 for implementing an improved marketing automation system having a smart controller, in accordance with embodiments of the present disclosure. Initially, a marketing automation system can allocate executors executing campaigns based on priority level. Over time, a smart controller of the system can develop intelligence around a given customer's inflow/outflow of incoming tasks and resource utilization. The smart controller can leverage its intelligence to ensure that executors are not dormant when there are not high priority tasks in the execution queue while ensuring executors are available for high priority tasks upon placement into the queue. Aspects of method 400 can be performed, for example, by campaign classifier engine 206, task controller engine 208, and smart controller engine 210 as discussed with reference to FIG. 2.

At block 402, a dataset related to a customer is received. In some embodiments, a client can have preexisting information related to campaigns (e.g., stored as a dataset). Such information can relate to events, activities, time stamps, campaigns timing (e.g., when campaigns are received), execution time (e.g., how long campaigns took to process). This preexisting information can be used to jumpstart the training of a smart controller. The smart controller can be used to develop intelligence around a given customer's inflow/outflow of incoming tasks and resource utilization. In particular, the smart controller can learn to predict an expected number and type of campaigns within a predefined timeframe. In other embodiments, the smart controller can build its knowledge over time as the marketing automation system executes marketing and operational campaigns. Such an approach can be followed when the system begins with little to no knowledge of a customer (e.g., the customer is new).

Regardless of how or when information is obtained, the dataset is used to train/update a learning model for a customer at block 404. The language model can be built using the intelligence or historical knowledge from the dataset (e.g., received at block 402). The learning model can be based on machine learning algorithms. In some embodiments, the learning model can be based on a regression (i.e., forecasting) model. Such a model can learn to predict the inflow of tasks during a given timeframe. In this way, the intelligence model builds knowledge about characteristics related to a given customer. Such characteristics can include peak hours, off-peak hours, average execution time, and such forth within a given customer subscription.

As the marketing automation system runs to execute tasks, information can be stored in the dataset. This information can be used to update the learning model. In this way, the learning model can be constantly updated (e.g., undergoes continuous learning). For example, the learning model can be updated periodically (e.g., once a day, once a week, twice a month).

At block 406, a task inflow is predicted for a window of time using the learning model. In particular, the learning model can predict an expected number and type of campaigns within a pre-defined window of time. Such predictions can include the number of leads and/or actions involved in the campaigns. Predictions can be based on the knowledge built around incoming tasks, as well as resource utilization. Intelligence from such built knowledge can be used to predict, for example, days and/or hours during which a customer typically runs marketing campaigns (e.g., a customer typically runs its most important—high priority—marketing campaigns on Wednesday and Thursday from 6 am to 12 pm). This intelligence can be leveraged to ensure that one or more executors are available to execute high priority campaigns upon placement into an execution queue. At the same time, this intelligence can be applied such that dormant executors, which may be allocated for executing high priority campaigns, can be used to execute low priority tasks At block 408, instructions are issued based on the predicted task inflow. In particular, the instructions can indicate a number of tasks sitting in a queue to be assigned to one or more executors (e.g., based on predicted availability of server resources). For instance, when a prediction indicates that resource utilization for a certain category of campaign is not maximized, the instructions can be issued based on this prediction. In embodiments, the instructions can indicate a number of low priority tasks sitting in a queue to assigned to one or more executors that typically executor high priority campaigns. In this way, for a predicted window of time, instructions can be issued that will pull one or more tasks from one category and assign to one or more executors. The instructions can be issued such that tasks assigned to the one or more executors should complete execution within the window of time. For instance, when the predicted resource utilization (or one or more executors) for the next window of time is 35%, 65% of the resources are predicted to be dormant. The intelligence component can determine one or more tasks in the queue that can be run using the remaining 65% of the resources and complete execution within the window of time.

At block 410, the actual task inflow for the window of time is monitored. The monitored actual task inflow can be compared with the predicted inflow. Comparing the prediction from the intelligence component with what is actually happening in real-time may result in determining that some action needs to be taken to mitigate a situation. In particular, when the tasks (e.g., low priority campaigns) assigned to executors is interfering with high priority campaigns (e.g., that were not predicted). The monitoring component can quiesce the tasks in execution. For instance, the monitoring component can quiesce low priority tasks being run on executors. In this way, high priority campaigns can be run using the now free executors.

Based on the monitored actual task inflow, at block 412, instructions are issued. In instances, these instructions can be issued by a smart controller. Such instructions can be issued directly to one or more executors. In other instances, instructions can be issued to, for example, a controller of the executors (e.g., task controller engine 208). Such instructions can be used to gracefully shut down and/or send low priority tasks assigned to execute on one or more executors back into the queue. Further, such instructions can then assign one or more high priority tasks to the one or more executors. When it is not possible to pause or abort a task being executed (e.g., mid-way through execution), the task can continue executing through completion.

Figure 5:
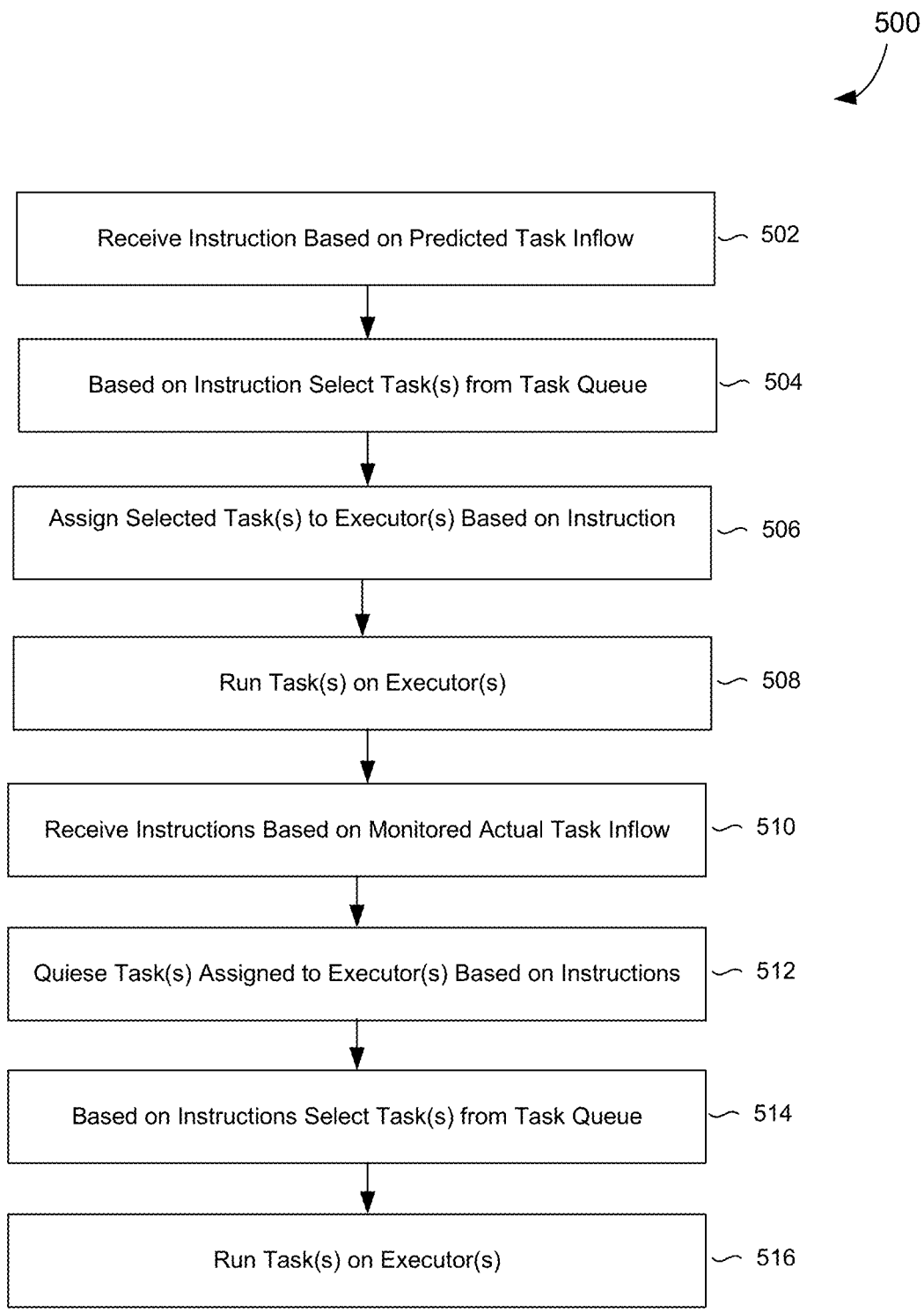
FIG. 5 provides a process flow showing an embodiment for implementing an improved marketing automation system for optimizing server resources for executing tasks, in accordance with embodiments of the present disclosure.

FIG. 5 provides a process flow showing an embodiment of method 500 for implementing an improved marketing automation system for optimizing server resources for executing tasks, in accordance with embodiments of the present disclosure. The smart controller can leverage learned intelligence to ensure maximal usage of executors while ensuring minimal wait time for high priority tasks. Aspects of method 500 can be performed, for example, by campaign classifier engine 206, task controller engine 208, and smart controller engine 210, as discussed with reference to FIG. 2.

At block 502, an instruction based on predicted task inflow is received. Such an instruction can be issued, for example, by a smart controller. The instructions can indicate a number of tasks sitting in a queue to be assigned to one or more executors (e.g., based on predicted availability of server resources). For instance, when a prediction indicates that resource utilization for a certain category of campaign is not maximized, the instructions can be issued based on this prediction. For instance, when the predicted resource utilization (or one or more executors) for the next window of time is 50%, 50% of the resources are predicted to be dormant. The intelligence component can determine one or more tasks in the queue that can be run using the remaining 50% of the resources during the window of time.

At block 504, task(s) are selected from a task queue. Task(s) can be selected based on instructions, such as the instructions received at block 502. In embodiments, the instructions can indicate a number of low priority tasks sitting in the queue to assign to one or more executors that typically executor high priority campaigns. In this way, for a predicted window of time, instructions can be issued that will pull one or more tasks from one category to assign to one or more executors. The instructions can be issued such that tasks assigned to the one or more executors should complete execution within the window of time.

At block 506, the selected task(s) are assigned to executor(s) based on the instruction. In embodiments, the executors can initially be allocated for executing campaigns based on priority level. For example, if there are ten executors, six or seven can be dedicated for executing high priority campaigns (e.g., time sensitive marketing campaigns), while the remaining three or four can be dedicated to executing low priority campaigns. Allocating a predefined set of executors for each class of campaigns ensures that a certain quality of service is maintained (e.g., with higher priority campaigns getting a large allocation of executors). Over time, tasks allocations of the executors can be become less relevant as the smart controller accurately predicts resource utilization. The smart controller can essentially take over assigning campaigns (e.g., by issue instructions) such that executors remain available to run predicted high priority tasks but are otherwise utilized to execute low priority campaigns. At 508, task(s) are run on executor(s). The executors can be those assigned, for example, at block 506.

At 510, instructions are received based on monitored actual task inflow. In instances, these instructions can be issued by a smart controller. Such instructions can be issued directly to one or more executors. In other instances, instructions can be issued to, for example, a manager of the executors (e.g., task controller engine 208). Such instructions can be based on a comparison between monitored actual task inflow and the predicted inflow. Comparing the prediction with what is actually happening in real-time may result in determining that some action needs to be taken to mitigate a situation. In particular, when the tasks (e.g., low priority campaigns) assigned to executors interfere with the timely execution high priority campaigns (e.g., that were not predicted). Instructions can be issued to quiesce the tasks in execution. For instance, the monitoring component can quiesce low priority tasks being run on executors. In this way, high priority campaigns can be run using the now free executors.

Such instructions can be used to gracefully shut down and/or send low priority tasks assigned to execute on one or more executors back into the queue. Further, such instructions can then assign one or more high priority task to the one or more executors. When it is not possible to pause or abort a task being executed (e.g., mid-way through execution), the task can continue through completion.

At block 512, task(s) assigned to executor(s) are quiesed. Task(s) can be quiesed based on instructions, such as the instructions received at block 502. In particular, when the tasks (e.g., low priority campaigns) assigned to executors interfere with high priority campaigns (e.g., that were not predicted), the interfering tasks in execution can be paused or removed (e.g., placed back into the queue). For instance, the monitoring component can quiesce low priority tasks being run on executors. In this way, high priority campaigns can be run using the now free executors. The instructions can indicate specific tasks (e.g., low priority tasks) to gracefully shut down and/or send back into the queue. Further, the instructions can indicate a high priority task to be assigned to those executors. Sometimes it is not possible to pause or abort a task being executed (e.g., mid-way through execution). In such cases, the task can continue through completion. Because predictions are made for time windows, even when a task cannot be quiesced, a high priority task should not remain in the queue for longer than the time window. For example, if a time window of predicted resource utilization is for 15 minutes and low priority tasks are assigned to all executors, a high priority task should only have to wait in the queue for 15 minutes until the low priority tasks complete execution. This waiting time can be lessened if one or more of the low priority tasks can be quiesced and sent back to the queue (e.g., managed by a task controller engine).

At block 514, task(s) are selected from the task queue based on the instructions. For example, such instructions can be used assign one or more high priority task to the one or more executors. At 516, task(s) are run on executor(s). For instance, the high priority tasks are run on the one or more executors that were previously running the low priority tasks.

Figure 6:
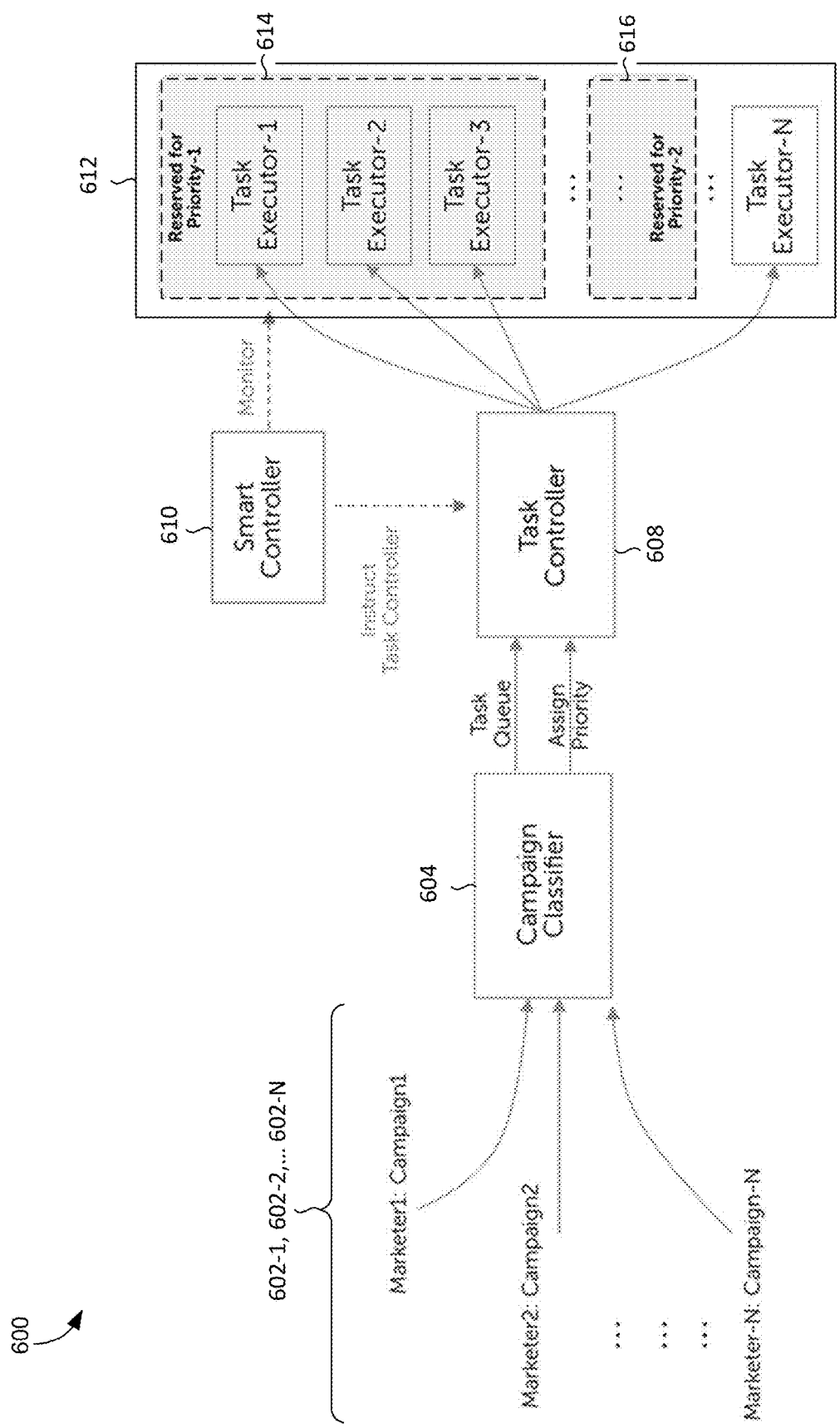
FIG. 6 provides an example environment that may be used to implement an improved marketing automation system for executing tasks, in accordance with embodiments of the present disclosure.

FIG. 6 illustrates an example environment 600 that may be used implement an improved marketing automation system for executing tasks, in accordance with embodiments of the present disclosure. In particular, one or more marketers can create one or more campaigns (i.e., 601-2, 602-2, 602-N). A single company may have multiple marketers that create campaigns. A single marketing automation system can manage all campaigns (e.g., tasks) created by marketers for an entire company.

Created campaigns (from the multiple marketers) can be submitted to campaign classifier 604. At the campaign classifier, campaigns can be assigned a priority. Priority can be assigned based on, for example, aspects of a campaign. In one embodiment, actions related to the campaign can be evaluated to classify the campaign (e.g., as an operational or marketing campaign). In some implementations, campaigns classified as marketing campaigns can be assigned a priority one and campaigns classified as operational campaigns can be assigned priority two.

Campaign classifier 604 can then input campaigns into a task queue (along with associated information indicating priority). Such a task queue can be managed using, for example, task controller 608. In an embodiment, there can be a single task queue for all campaigns. Within such a single task queue, campaigns can be ordered based on priority (e.g., one/two or high, medium, low). In other implementations, there can be multiple task queues for the campaigns. When using multiple task queues, each priority of campaign can have its own queue (e.g., high priority queue, low priority queue, etc.). It should be appreciated that in some embodiments, that there can be further priority within each level of priority (e.g., priority one level queue with high, medium, low priority campaigns). In embodiments, as the task controller receives campaigns, the campaigns are added to the one or more task queues using associated priority.

The task controller can also assign campaigns in the one or more task queues to one or more executors 612. The executors can be server resources for executing (i.e., running) the campaigns. In some embodiments, the executors (i.e., task executors) can be allocated for executing campaigns based on priority level. For example, as depicted, if there are N-executors, three executors can be dedicated for executing priority one campaigns (e.g., executors 614), while one executor can be dedicated to executing priority two campaigns (e.g., executor 616). Allocating a pre-defined set of executors for each class of campaigns ensures that a certain quality of service is maintained (e.g., with higher priority campaigns getting a large allocation of executors).

Over time, smart controller 610 can begin to oversee task controller 608 based on intelligence developed around a historical inflow and outflow of campaign tasks for a customer. In embodiments, the smart controller can predict task inflow for a window of time. In particular, an expected number and type of campaigns can be predicted within a pre-defined window of time. Predictions can be based on the knowledge built around incoming tasks as well as resource utilization. Intelligence from such built knowledge can be used to predict, for example, days and/or hours during which a customer typically runs marketing campaigns (e.g., a customer typically runs its most important—high priority—marketing campaigns on Wednesday and Thursday from 6 am to 12 pm). This intelligence can be leveraged to ensure that one or more executors are available to execute high priority campaigns upon placement into an execution queue (e.g., any of executors 612). At the same time, this intelligence can be applied such that dormant executors (e.g., task executor-1, task executor-2, and/or task executor-3), which may be allocated for executing high priority campaigns, can be used to execute low priority task.

Figure 7:
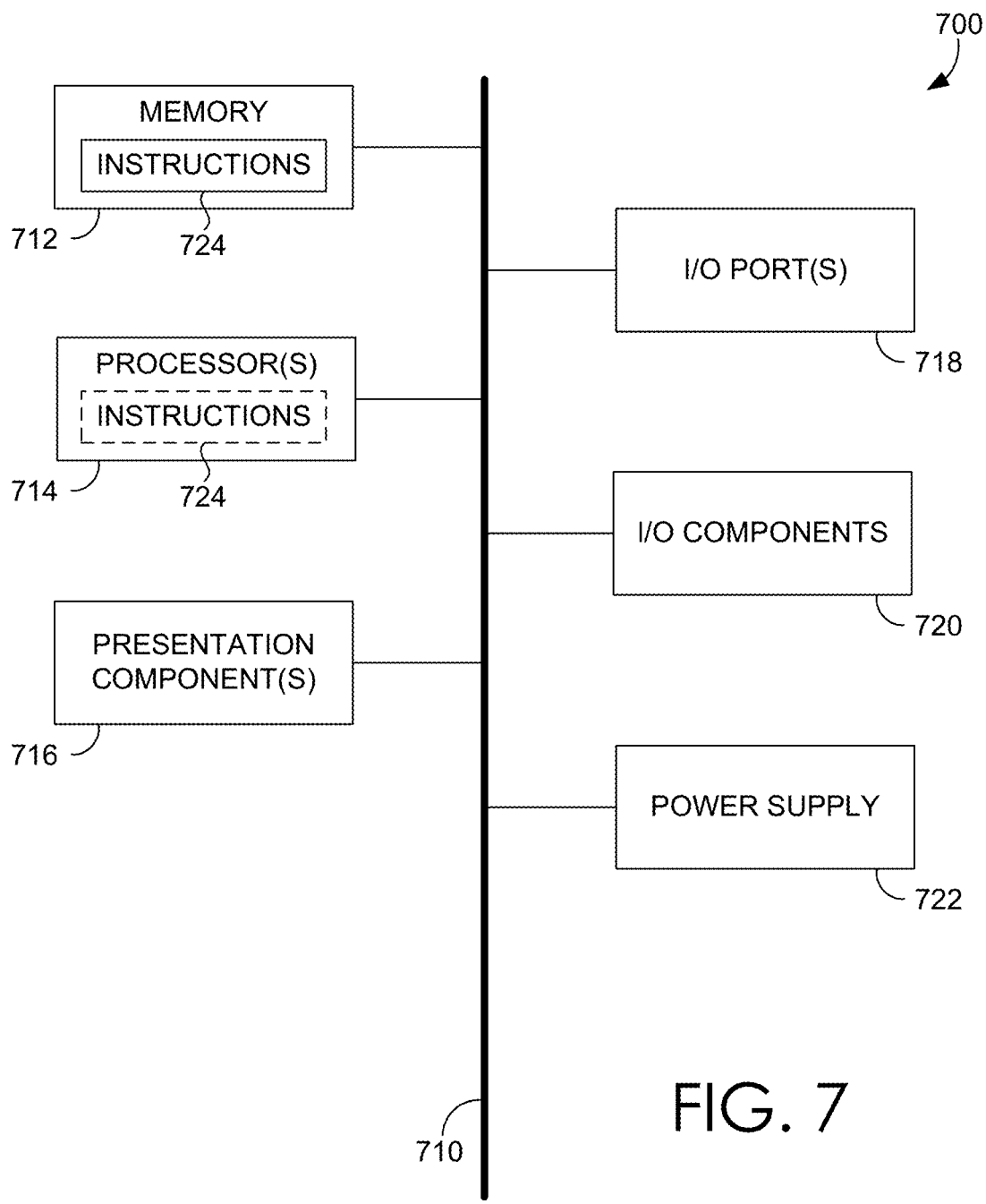
FIG. 7 is a block diagram of an example computing device in which embodiments of the present disclosure may be employed.

The smart controller can also monitor task inflow in real-time may result in determining that some action needs to be taken to mitigate a situation. In particular, when the tasks (e.g., low priority campaigns) assigned to executors (e.g., task executor-1, task executor-2, and/or task executor-3) is interfering with a high priority campaign (e.g., that were not predicted). The smart controller can interact with the task controller such that the low priority tasks (e.g., running on task executor-1, task executor-2, and/or task executor-3) can be gracefully shut down and/or sent back into the queue. For instance, the monitoring component can quiesce low priority tasks being run on executors. In this way, high priority campaigns can be run using the now free executors Having described embodiments of the present invention, FIG. 7 provides an example of a computing device in which embodiments of the present invention may be employed. Computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above-discussed figures, or to implement any program modules described herein. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
   predicting an inflow of tasks for a window of time, the predicted inflow of tasks including at least one task of a first type;
   determining availability of an executor to execute a second type of task during the window of time based on the predicted inflow of tasks;
   based on the availability, initiating assignment of a task of the second type in a task queue to the executor;
   assigning the task to run on the executor during the window of time; and
   monitoring an actual inflow of tasks for the window of time;
   determining an action is needed to mitigate a situation based on the actual inflow of tasks;
   initiating the action to mitigate the situation, wherein the action quiesces the task;
   assigning a new task to run on the executor; and
   running the new task on the executor.

2. The computer-implemented method of claim 1, further comprising:
   running the task on the executor.

3. The computer-implemented method of claim 1, further comprising:
   receiving the task;
   classifying the task based on an action associated with the task; and
   determining a priority for the task based on the classification of the task.

4. The computer-implemented method of claim 3, further comprising:
   adding the task to the task queue, the task associated with the priority.

5. The computer-implemented method of claim 1, wherein the inflow of tasks is predicted using a learning model trained using historical knowledge about usage of server resources.

6. The computer-implemented method of claim 1, wherein the action is needed when the new task is an unexpected high priority task in the actual inflow of tasks.

7. The computer-implemented method of claim 1, the availability based on remaining capacity of the executor during the window of time after running the predicted inflow of tasks on the executor.

8. The computer-implemented method of claim 1, wherein quiescing the task reassigns the task to the task queue.

9. One or more computer storage media storing computer-useable instructions that, when used by one or more computing devices, cause the one or more computing devices to perform operations comprising:
   predicting an inflow of tasks for a window of time using a learning model trained on historical knowledge about usage of server resources;
   determining availability of the server resources based on the predicted inflow of tasks;
   based on the availability, initiating a task to be assigned to an executor of the server resources, wherein the task is predicted to finish run on the executor within the window of time;
   assigning the task to run on the executor; and
   monitoring an actual inflow of tasks for the window of time;
   determining an action is needed to mitigate a situation based on the actual inflow of tasks;
   initiating the action to mitigate the situation, wherein the action quiesces the task;
   assigning a new task to run on the executor; and
   running the new task on the executor.

10. The one or more computer storage media of claim 9, further comprising:
    receiving the task;
    classifying the task based on an action associated with the task; and
    determining a priority for the task based on the classification of the task.

11. The one or more computer storage media of claim 10, further comprising:
    adding the task to a task queue, the task associated with the priority.

12. The one or more computer storage media of claim 9, wherein the action is needed when the new task is an unexpected high priority task in the actual inflow of tasks.

13. The one or more computer storage media of claim 9, the availability based on remaining capacity of the executor during the window of time after running the predicted inflow of tasks on the executor.

14. The one or more computer storage media of claim 9, wherein quiescing the task reassigns the task to a task queue.

15. The one or more computer storage media of claim 9, wherein the action is needed when the new task is an unexpected high priority task in the actual inflow of tasks.

16. The one or more computer storage media of claim 9, the availability based on remaining capacity of the executor during the window of time after running the predicted inflow of tasks on the executor.

17. A computing system comprising:
    one or more processors; and
    one or more computer storage media storing computer-usable instructions that, when used by the one or more processors, cause the one or more processors to perform operations, the operations comprising:
    predicting an inflow of tasks for a window of time, the predicted inflow of tasks including at least one task of a first type;
    determining availability of an executor to execute a second type of task during the window of time based on the predicted inflow of tasks;
    assigning a task of the second type in a task queue to an executor using the determined availability of the executor based on the predicted inflow of tasks; and monitoring an actual inflow of tasks for the window of time;
determining an action is needed to mitigate a situation based on the actual inflow of tasks;
initiating the action to mitigate the situation, wherein the action quiesces the task;
assigning a new task to run on the executor; and
running the new task on the executor.

* * * * *